(12) United States Patent
Bellontine

(10) Patent No.: US 8,662,898 B2
(45) Date of Patent: Mar. 4, 2014

(54) GOAL ACHIEVEMENT GAME AND METHOD

(76) Inventor: Joan Bellontine, Huntington Station, NY (US)

( * ) Notice: Subject to any disclaimer, the term of this patent is extended or adjusted under 35 U.S.C. 154(b) by 351 days.

(21) Appl. No.: 12/661,289

(22) Filed: Mar. 15, 2010

(65) Prior Publication Data

US 2011/0223570 A1  Sep. 15, 2011

(51) Int. Cl.
*G09B 25/02* (2006.01)

(52) U.S. Cl.
USPC .......................................................... 434/236

(58) Field of Classification Search
USPC ............................................... 434/236, 66
See application file for complete search history.

(56) References Cited

U.S. PATENT DOCUMENTS

| | | | | |
|---|---|---|---|---|
| 3,843,133 | A | * | 10/1974 | Brown ........................ 273/282.1 |
| 3,895,804 | A | * | 7/1975 | Lee ................................ 273/242 |
| 4,344,625 | A | * | 8/1982 | Frudakis ...................... 273/242 |
| 4,889,345 | A | * | 12/1989 | Wawryk ........................ 273/249 |
| 4,955,616 | A | | 9/1990 | Ingalls |
| 5,054,775 | A | * | 10/1991 | Banks et al. .................. 273/431 |
| 5,108,112 | A | * | 4/1992 | Gould ........................... 273/255 |
| 5,472,207 | A | * | 12/1995 | Sullivan et al. ............... 273/249 |
| 5,577,915 | A | | 11/1996 | Feldman |
| 5,639,242 | A | * | 6/1997 | Wilson .......................... 434/238 |
| 5,954,510 | A | | 9/1999 | Merrill et al. |
| 6,120,296 | A | * | 9/2000 | Lim .............................. 434/128 |
| 6,203,327 | B1 | | 3/2001 | Ottrando |
| 6,345,821 | B1 | | 2/2002 | Labrot |
| 6,442,527 | B1 | | 8/2002 | Worthington |
| 6,682,074 | B2 | * | 1/2004 | Weston ......................... 273/459 |
| 6,939,229 | B2 | * | 9/2005 | McClintic ....................... 463/25 |
| 7,337,120 | B2 | | 2/2008 | Andrus et al. |
| 7,571,911 | B2 | * | 8/2009 | Lim ............................... 273/243 |
| 7,625,285 | B2 | * | 12/2009 | Breving .......................... 463/37 |
| 7,631,873 | B2 | * | 12/2009 | Scriven ......................... 273/273 |
| 7,699,614 | B2 | * | 4/2010 | Thurman ...................... 434/237 |
| 2004/0150215 | A1 | | 8/2004 | King |
| 2005/0202380 | A1 | | 9/2005 | Iwamoto |
| 2005/0287505 | A1 | | 12/2005 | George |
| 2006/0172268 | A1 | | 8/2006 | Thurman |
| 2010/0285433 | A1 | * | 11/2010 | Kotler et al. .................. 434/128 |

FOREIGN PATENT DOCUMENTS

WO   WO 94/04231   3/2004

* cited by examiner

*Primary Examiner* — Kurt Fernstrom
*Assistant Examiner* — Dolores Collins
(74) *Attorney, Agent, or Firm* — John F. Vodopia, Esq.

(57) ABSTRACT

A theme-based goal achievement game for modifying a student's themed behavior in cooperation with teacher input at both home and at school includes a theme-based gameboard for display in the student's home configured on a front side with a contiguous theme-based path, the path having a plurality of positions representative of completion of theme-defined tasks, a place marker for marking the student's instant position reflecting the student's cumulative progress traversing the theme-based path and a set of instructions for educating both the home and the school teacher on the themed behavior. The student is presented with pre-defined theme-based goals by the home or school teacher.

8 Claims, 10 Drawing Sheets

Your Child's Well-Being Brought To You By:

*Eating Fruits and vegetables has never been so much fun!*

Instructions:

1. Before you begin the game, decide on four incentives that will excite and motivate your child (Three smaller incentives plus one HUGE motivator).
2. Have fruits and vegetables available for your child.
3. Use tape or "fun-tack" to display the game in a common area (e.g. refrigerator). Use a dry erase marker to write incentives on reward card.
4. Each time your child 5 fruits and / or vegetables a day, they may move up a square by marking their board with a stamper. It is the childs responsibility to move game piece NOT the adult's.
5. If a child does not eat their fruits and veggies for the day they can stamp a ☺ (Nobody's Perfect) space. They must budget them well because they only get 4 for the entire 30 day period. If they use all of their NP spaces they must go BACK TO START.
6. Each time they get to the ☆reward them with their incentive that has been written on the reward card.
7. When the child gets to the ♥ they need to do at least 15 minutes of exercises so that they can continue to move forward (See box to left)
8. At game's completion, congratulate them with the Certificate of Achievement and award them with their final prize.

DO THIS FOR A HEALTHY YOU:

Eat fewer high calorie snack foods, and less fast food, sodas, and fruit drinks.
Eat slowly and recognize when you are full then STOP.
Do not eat in front of the television.
Cut down on sugar.
Limit intake of fried foods like chicken fingers and french fries. (only on rare occasions)
Increase the amount of fiber in your diet - ask your caretakers for help with this.
When you are at the grocery store, look at labels and buy foods that are good for you!!
Drink WATER!! At least 6 glasses per day.
watch out for PORTION CONTROL. Use smaller plates. At restaurants have your food wrapped to go!
MOVE YOUR BODY!! Each day a child should do at least 30 minutes of physical exercise.

TYPES OF FUN EXERCISES:

playing Outside - Jump Rope - Hoola Hoop - Frisbee - Hopscotch - Stretching
Jumping Jacks - Jogging - Rollerblading - Bicycling - Dancing - Kickball - Karate

Meet Grace !!!

HEY KIDS, have you ever wondered what special needs kids are really like ? Grace has a very rare condition that makes her unable to speak but she also has lots of important lessons to teach us all!! Visit her at WWW.GRACECURES.ORG often. You can see what she is doing and play a fun game too !

*Grace is a teacher !*

FOR MORE INFORMATION ABOUT GRACE AND FOR OTHER GAMES PLEASE VISIT WWW.GRACECURES.ORG

FIG. 4

GOAL ACHIEVEMENT GAME AND METHOD

FIELD OF THE INVENTION

The present invention relates to achieving goals broadly and, more particularly relates to goal achievement game or game system, and a method of teaching individuals the behaviour required in life to attain or achieve one's goals, including modifying or learning new behaviours, in cooperation with the various elements comprising the game.

BACKGROUND OF THE INVENTION

Teaching may be described as an act or experience having a formative effect on the mind, character or physical ability of an individual, i.e., the student. Education, which includes teaching, is systemic transmission accumulated knowledge, skills and values. Etymologically, the word education contains educarae (Latin) "bring up" which is related to educere "bring out", "bring forth what is within", "bring out potential" and ducere "to lead." The term teaching refers to the actions of a real live instructor designed to impart learning to the student, referred to as "teacher" herein. The term learning refers to learning with a view toward preparing learners with specific knowledge, skills, or abilities that can be applied immediately upon completion, the learners referred to as students, herein, regardless of age or circumstance.

Teachers must first understand a subject sufficiently to convey its essence to students, and must do so using some technique. Traditional teaching techniques involve lecturing on the part of the teacher. New teaching or instructional techniques may include discussion (facilitated by a teacher) and coaching where the student may more actively learn, so in a sense discovering the subject of the course. Broadly, however, the goal of teaching remains the same: to establish a sound knowledge base and skill set on which students may build when exposed to different life experiences.

While teaching to convey a set of material, for example, the alphabet or sets of times tables, may include (and require) repetitive presentation, teaching of skills and behaviours, as distinguished from sets of fact-based knowledge can be more challenging for an educator (teacher and educator may be used interchangeable herein). Techniques for teaching new behaviours necessary to achieve certain goals, however, or to modify certain behaviours to achieve certain (or uncertain) goals; can be quite challenging. The effectiveness of the teaching is dependent upon the quality of the teacher-student interaction, which is particularly dependent on a teacher's ability to gain the student's undivided attention. As teachers know, however, a student's undivided attention can be a transient thing wholly dependent upon the teacher's or the teaching material's ability to both capture and maintain the student's undivided attention.

Various games, game systems and game- or theme-based teaching techniques are known that attempt to improve the effectiveness of teaching, student learning, student behavioural training and student behavioural modification, without limitation.

A number of these known games, game- or theme-based systems and techniques are computer specific. For example, US Patent Appln. Pub. No. 2005/0202380 discloses a personal evaluation method and system, information processing unit and program. US Patent Appln. Pub. No. 2005/0287505 discloses a system of teaching success and method. US Patent Appln. Pub. No. 2004/0150215 discloses a personal goal tracking system and method. U.S. Pat. No. 6,442,527 discloses system and method for personalized and customized time management. U.S. Pat. No. 7,337,120 discloses a method for providing human performance management data and insight and U.S. Pat. No. 5,954,510 discloses an interactive goal achievement system and method.

U.S. Pat. No. 5,954,510, in more detail, discloses an interactive system and method for assisting people in achieving and learning to achieve self-determined, measurable goals over time by collecting data from a user on the user's progress over time. Random or scheduled positive or negative reinforcement is provided in the computer interactive learning environment, which is provided to a student sitting at a computer console at a laptop or workstation. FIGS. 3A, 3B and 4A-4G of U.S. Pat. No. 5,954,510 show various computer system embodiments in which the system is implemented. While instant feedback via a computer/student interface may provide some motivation for a student implementing new behaviour of modifying existing behaviour, the computer screen and input device tend to be impersonal and do not have the same effectiveness for maintaining a student's attention as does a live session with a teacher, still less a live teacher in cooperation with structured, interactive game elements.

Hence, the computer-centric learning techniques disclosed in U.S. Pat. No. 5,954,510, like those disclosed in US Patent Appln. Pub. No. 2005/0202380, US Patent Appln. Pub. No. 2005/0287505, US Patent Appln. Pub. No. 2004/0150215, U.S. Pat. Nos. 6,442,527, 7,337,120 and 5,954,510, are limited in their effectiveness.

As distinguished from computer-based devices and techniques, various motivational and behavior teaching methods and games are known. The known method or techniques may use physical objects, such as game boards, place savers for moving along the game board, may implement rewards for game progress, etc. That is, they rely on a tactile effect based on a student's physical interaction with a board, and/or other attention-keeping effect of a board and the features maintained thereof.

For example, U.S. Pat. No. 6,345,821 discloses a household chore designation game with an erasable board structure, U.S. Pat. No. 5,577,915 discloses motivational task tracking device, and U.S. Pat. No. 4,955,616 discloses a board game with a board and marker manipulated through movement paths simulating life experience events, PCT Patent Appln. WO 94/04231 for a board game apparatus with goal setting means, US Patent Appln. Ser. No. 2006/0172268 discloses a behavior shaping system and kits and U.S. Pat. No. 6,203,327 discloses a toilet training system and method that use a game board with a pre-printed path.

In more detail, behaviour shaping system and kits disclosed in US Patent Appln. Pub. No. 2006/0172268 comprises a game board with a triangle or pyramid with levels and means for marking the spaces. Each time a student accomplishes a skill being taught, a caregiver marks a space. This type of operation, however, limits the actual physical involvement and input in the training by the student. While such a game and gameboard might keep the student's attention while in the active teaching process, it may prove ineffective in teaching a student how to modify their own behaviour, that it, it might teach them an ontology but not how to modify their own behaviour for future needs.

In the toilet training system disclosed in U.S. Pat. No. 6,203,327, a pre-printed path on a board utilized in the toilet training method comprises step spaces and reward goal spaces. The disclosure a technique for toilet training using the board whereby a parent works with a student in order that the student select a reward type. The parent then writes (describes) the reward in a reward space on the game board. When the student successfully uses the toilet, the parent again interacts with the student, acknowledges the student's successful use of the toilet, and physically marks one of the step spaces.

This space as marked by the parent (teacher) memorializes the student's progress to at least the parent, and to the student if he/she notices the parent action, which is much more likely if the student being toilet trained is of reading age. And if the parent shows the student that their progress allows them to advance to a place on the board that is a reward space, the student should receive a reward from the parent (teacher), as a form of positive reinforcement. If the student does not successfully use the toilet, the parent (teacher) may bring it to the student's attention, including making a show of erasing a space on the board, as a form of negative reinforcement.

While such apparatus and method may eventually train the student to effectively use a toilet when a biological need arises, it is limited as a behavioural modification technique. For example, the technique does not engage the student enough. The board spaces are traversed as much by the parent as the student, so may be looked upon by the student as a temporary or transient interaction, not necessarily a portion of a modified behaviour. For that matter, the technique does not engage the student in other areas or parts of the student's life. For example, there is no suggestion that the technique engages a teacher at school as well as the parent, so that the student is compelled to recall or physically act while at school as well as home. Nor does the disclosed technique appear to appear to include educating the parent or teacher on the process of imparting the toilet training. That is, the technique merely includes an interaction between parent and student to accomplish the student's movement along the board upon the conditions precedent, but does not go as far as first educating the parent still less educating a teacher at school to enlarge the student's exposure to the behaviour modification.

SUMMARY OF THE INVENTION

A goal theme-based goal achievement game and method of teaching goal-oriented behaviour modification that overcomes the shortcomings of known goal achievement games, system and methods is disclosed and presented hereby.

In one embodiment, the inventive a theme-based behaviour modification game includes a theme-based gameboard for use by student or adults in effort to support goal achievement and developing patterns that support goal achievement, that is, modifying a student's behaviour.

The game might be used in a school or home setting by teachers and parents, but also by adults who need an extra incentive to achieve their own goals, and/or modify their goal-oriented behavior and patterns, e.g., not eating the last macaroon or walking at 6 AM on a Wednesday morning for 20 minutes even though he/she is dog tired.

A goal achievement game, comprising: a gameboard for display in a user's home that is configured with a contiguous theme-based path comprising a plurality of positions representative of completion of theme-defined tasks, the positions including a start position, a finish position and interim reward positions therebetween; and a place marker for marking the user's instant position, which reflects the user's cumulative progress traversing the theme-based path; wherein the user is presented with pre-defined theme-based goals the completion of which corresponding to path positions, wherein the reward positions represent achievement of an interim, pre-finish position and wherein the user is rewarded upon progressing to the reward and finish positions The place marker may be a board piece that is temporarily fixed to a position on the theme-based path to reflect the user's progress, a stamp by which the instant position is marked on the gameboard (preferably readily erasable). For that matter, the gameboard and path may include a pre-determined amount of "nobody's perfect spaces," where a student can mark the space as a "life-line" in case he is not able to complete the task that day, and not be penalized.

The game may further comprise a scorecard that may be managed by an instructor (e.g., school teacher), to be carried with the user between home and the place of instruction, and to indicate the user's goal achievement progress. A bunch of stickers are used with the scorecard, as well as school or home teacher initials. The information on the card is then used by a parent or guardian to support the user's interaction with the gameboard.

Alternatively, the gameboard may be used for team activity, and modifying a group of student's or even an adult group's behavior. As an example, after the teacher understands the subject matter, a gameboard, or a game-sheet in a form of a gameboard, is hung on the wall of classroom for use by the teacher to help motivate the students throughout the school day en masse. The method is intended to include the use of movement activities, e.g., yoga moves, in which the class as a whole participates. These physical interaction by each student in part of a group of students working together to learn provides a significant effect on students, as understood by those of skill in the art. The moves themselves may further enhance learning, for example, assist in educating student on certain concepts. For example, a triangle pose or hands together over heads in a form of a "0", or a "1", or two students together as a "1" and a "0" toform a "10" for math concepts. For that matter, there may be a component of competition injected into the method to motivate the students to be the first to answer the question and/or to demonstrate a positive behaviour (or limit a negative one) because they would get credit for answering first, and further reinforcement therefore in a form of a sticker or positive remark on a score card that would be kept in their desk.

An enlarged gameboard (e. g., 11×17; 17×34; 22×36; 34×64) is quite similar to the home or desk (reduced-size) gameboards or game-sheets. It is just printed to be larger, e.g., like a poster that hangs on a wall in a classroom. The gameboard for the group-based game and teaching method that includes the use of same, whether separately, or in addition to the school/home gameboard and accompanying elements, is different in that it is used by the teacher in the classroom only, and not used at home. The teacher uses the enlarged gameboard or sheet to modify the behaviour of the group of students under instruction, or playing the game, to take note of observed behaviours, for example, where one of the student participants is "caught being good."

This enlarged gameboard is sold in a kit commercially with a set of cards. The cards in the set of cards can be interchanged so that the school teacher can work on any particular behaviour using one of the techniques, for example, "caught being good" as mentioned above or "collection of compliments," by which the student moves forward a space on the gameboard any time they receive a compliment. Preferably, several of the cards are blank so they may be personalized by the school teacher in order to define any goal for a student or class of students that the school teacher understands to be important, especially for the school teacher's particular classroom setting.

That is, each time a student is caught being good, an instant position of the enlarged gameboard is advanced one space. Preferably, the initials of the student caught being good are marked next to the stamp on the board. The enlarged gameboards may be any theme, for example, that including the "giving bridge" theme. When the method is executed to carry out the giving bridge theme, class as a whole must collectively give something to someone else, or to another group of people. If they do this, they get to "home" sooner because they get to skip the final last two spaces of the board.

For that matter, the game board includes an embodiment that is essentially a reduced version that can be affixed to a student's desk at home or in school, so may be used frequently throughout the day (particularly as affixed to a school desk) to either promote a good behavior or to reduce the occurrences of a particular "undesirable" behavior. The method of teaching uses the additional reinforcement either in lieu of or in cooperation with the full gameboard in the student's home, as already described above.

It should further be pointed out that the concepts to be conveyed may include certain mind-body awareness, as distinguished from traditional common knowledge using known techniques. The gameboard and method of teaching using same affects more than just the student's brain/mind. That is, the gameboard and method of cooperation therewith may be said to be "whole-student focused" incorporating and engaging their mental, physical and emotional capacity. The instruction make clear that the games "teach" teachers how to focus on more than just the "neck up" when attempting to educate student, essentially encouraging a sense of self-esteem and autonomy to the student.

BRIEF DESCRIPTION OF THE DRAWINGS

The present invention can best be understood in connection with the accompanying drawings. It is noted that the invention is not limited to the precise embodiments shown in drawings, in which:

FIG. 4 depicts one embodiment of an instruction side of the theme-based gameboard shown in FIG. 3;

DETAILED DESCRIPTION OF THE INVENTION

The following is a detailed description of example embodiments of the invention depicted in the accompanying drawings. The example embodiments are in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

As shown in the accompanying figures, a theme-based goal achievement or behaviour modification game for use by student or adults in effort to support goal achievement, developing patterns that support goal achievement and modifying behaviour that facilitates an improved ability in the student at setting and achieving goals.

The game is for use in a school and/or home setting by teachers and parents, but also by adults who need an extra incentive to achieve their own goals, and/or modify their goal-oriented behaviour and patterns, e.g., not eating the last macaroon or walking at 6 AM on a Wednesday morning for 20 minutes even though he/she is dog tired. The game includes a gameboard that is traditional or virtual, as now described.

In one embodiment, the invention comprises a theme-based goal achievement game for modifying a student's themed behavior in cooperation with teacher input at at least one of home, for example, a parent, and school, for example, a teacher or behaviourist. The game comprises a theme-based gameboard for display in the student's home, configured on a front side with a contiguous theme-based path.

Figure 1:
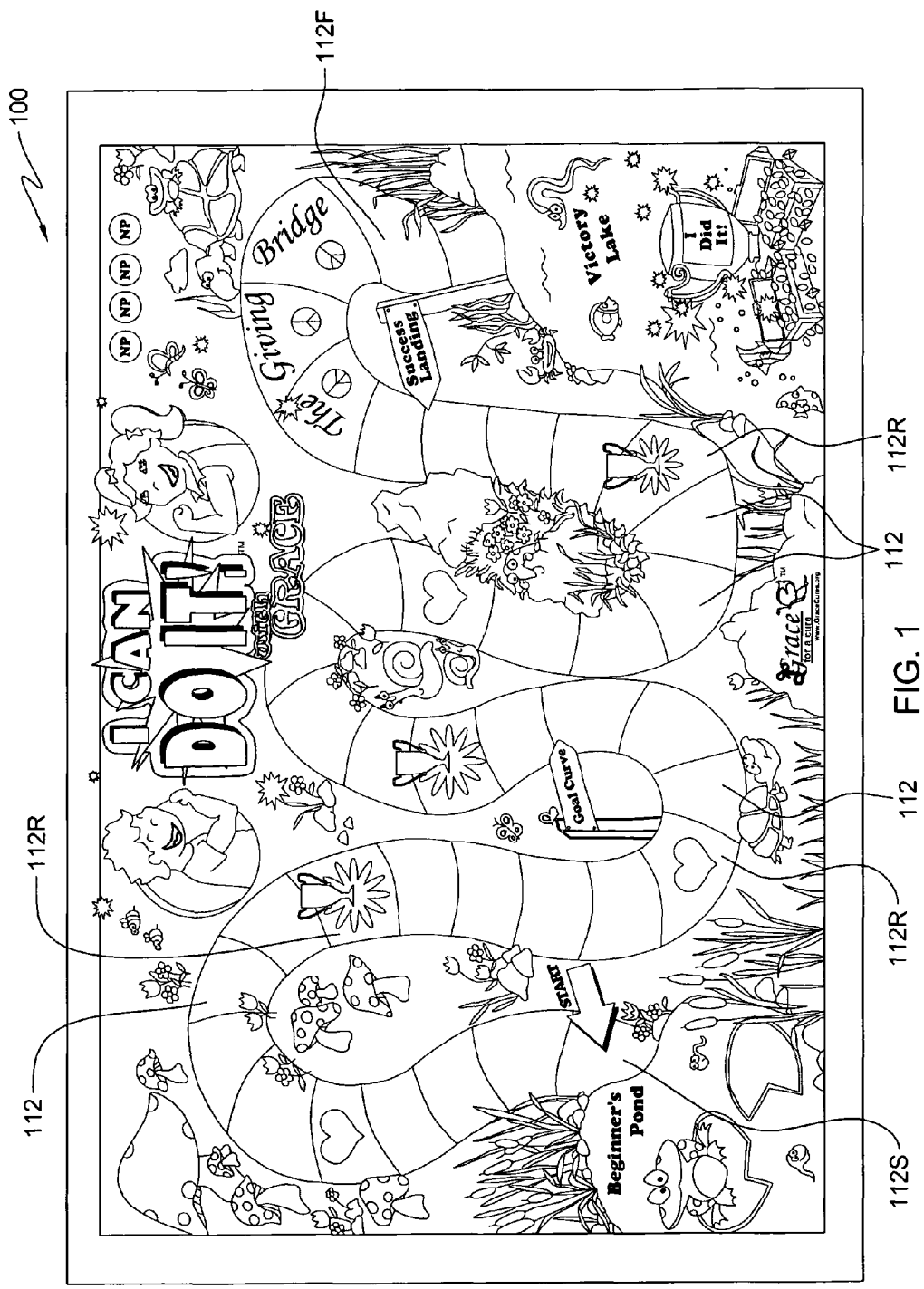
FIG. 1 depicts one embodiment of a playing side of a theme-based gameboard of the invention.
Figure 2:
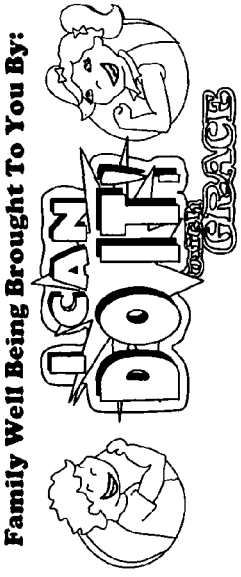
FIG. 2 depicts one embodiment of an instruction side of the theme-based gameboard shown in FIG. 1.
Figure 3:
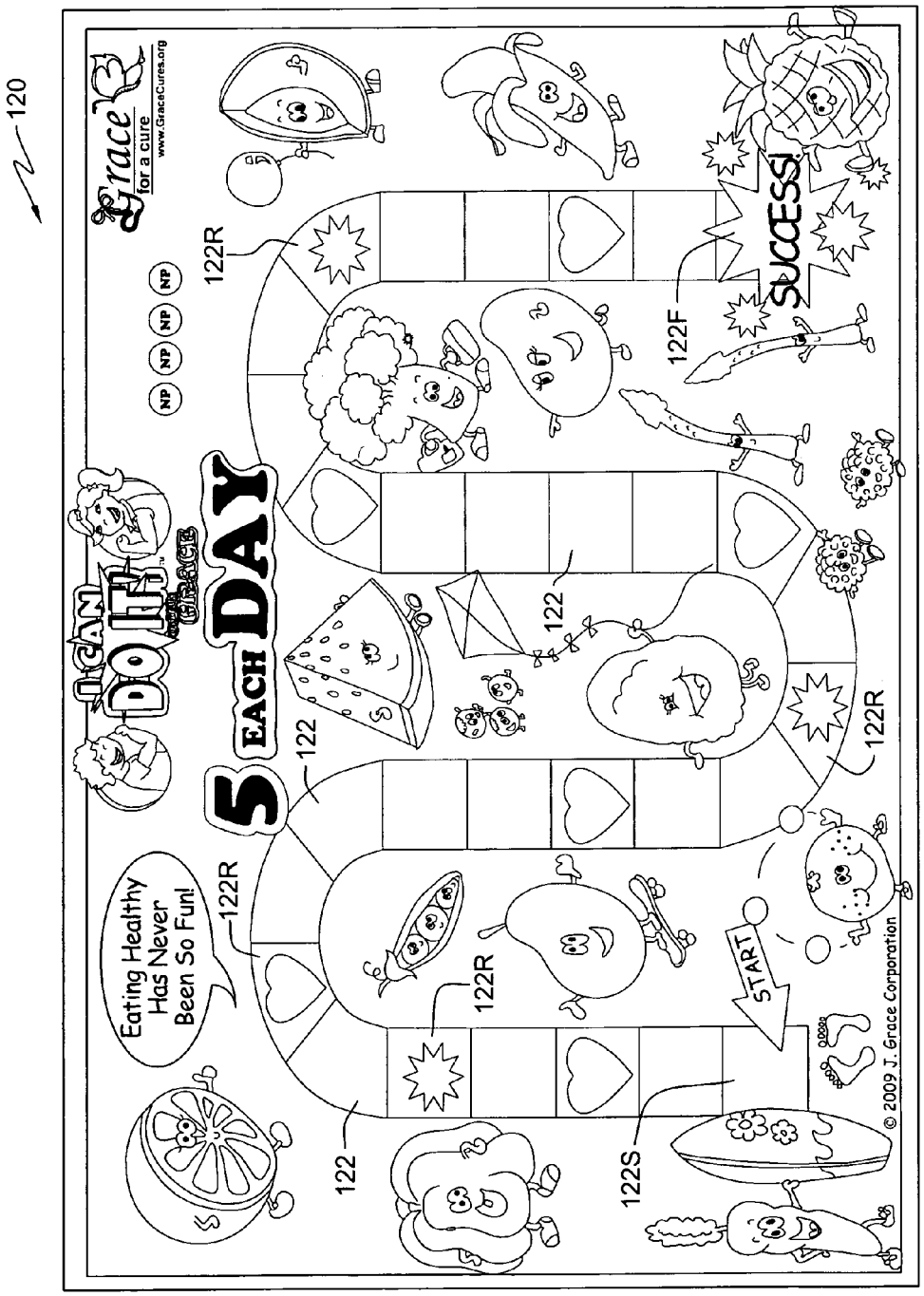
FIG. 3 depicts another embodiment of a playing side of a theme-based gameboard of the invention.

FIG. 1 depicts an "I can do it" gameboard (100) with a treat yourself kindly theme. FIG. 2 shows a back or instruction side (110) of the FIG. 1 gameboard. FIG. 3 depicts and "I can do it" gameboard (120) with a "do this for a healthy you" theme. FIG. 3 shows a back or instruction side (130) of the FIG. 3 gameboard. The gameboards (100, 120) comprise a plurality of positions (112; 122) representative of completion of theme-defined tasks that include a start position (112S; 122S), a finish position (112F; 122F) and interim reward positions (112R; 122R) therebetween. The reader should note that the embodiments shown are for exemplary purposes only, and that the invention is not limited to the gameboards and instructions for same as shown in FIGS. 1-4.

The game includes a place marker for marking the student's instant position on the gameboard. The instant gameboard position reflects the student's cumulative progress in completing the respective theme-defined tasks and therefore traversing the theme-based path. A place marker may be a stamp, crayon, highlighter, pen pencil, etc., without limitation. Each task is assigned to the student, either individually by a teacher, or in accordance with a set of theme-based instructions. That is, a set of instructions (FIG. 2, 4) for educating the home and the school teacher or behaviorist on the themed behavior and the instructions for supporting the student to modify his/her themed behavior by participating in the game in cooperation with the theme-based gameboard are included with each game. The instructions educate the teachers about the theme, and about how to use the gameboard to teach the student how to interact with the gameboard and teacher(s) and thereby learn to modify his/her behaviour.

Preferably, the home teacher and school teacher instructions and theme-based information are pre-printed on a back-side of the gameboard. Alternatively, the instructions and theme-based information further comprises an information curriculum packet of printed material for the student's use, said printed material correlated to the gameboard and goals. The information curriculum packet further includes at least one of printed booklets, audio tapes, video tapes, compact discs, information cards and placards, and in some cases, an element of special needs awareness. A yoga-based curriculum utilizes a "Multiple Intelligences theory." The multiple intelligences theory games, like all games, have an element of special needs awareness.

The student is presented with pre-defined theme-based goals by one of the home teacher, the school teacher or behaviorist and both. The student progresses by completing the tasks assigned to him/her, progress towards completion of which corresponding to path positions on the gameboard. For that matter, sometimes the student will choose their own tasks as well, for example, in cooperation with a spinner allowing the task to be correlated to possible spin spots. These path positions include interim achievement reward positions, which reflect real behavioural modification progress. The rewards provided to the student at the interim reward path positions are preferably reinforced by the teacher's interaction at home or school, and preferably at both home and school. The multiple interactions by the student with the teachers and gameboard, particularly the multiple interim reward positions is intended to engage the student's attention as often as possible throughout each day of which the student actively participates in the game.

While the place marker is described above as a means for leaving a mark on the gameboard, it is not limited thereto. The place marker may also embody a board piece that is temporarily fixed to each gameboard position by the student on the theme-based path to reflect the student's cumulative progress. For example, the place marker may have a sticky end that removably attaches to a game board position, or a Velcro portion that cooperates with a piece of Velcro attached or affixed to each path position.

Figure 5:
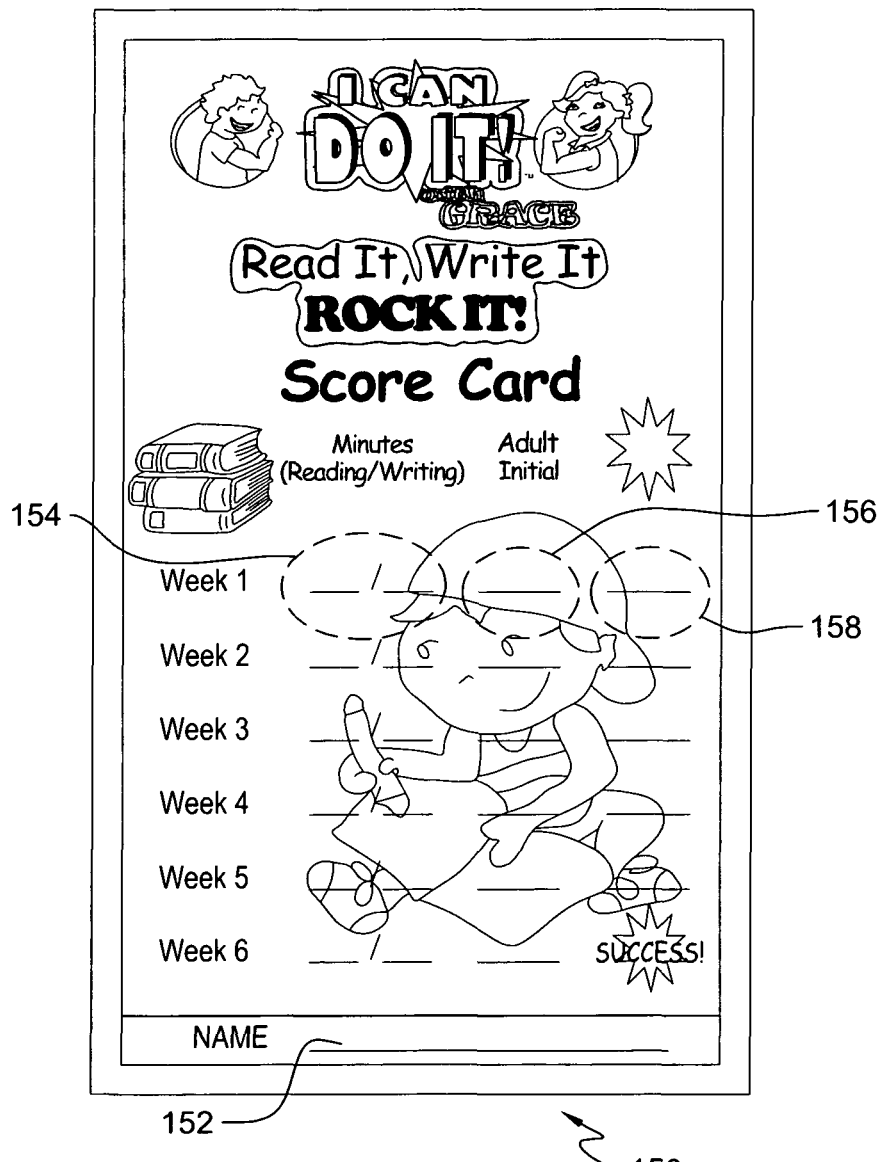
FIG. 5 is one embodiment of a score card for use with the invention.
Figure 6:
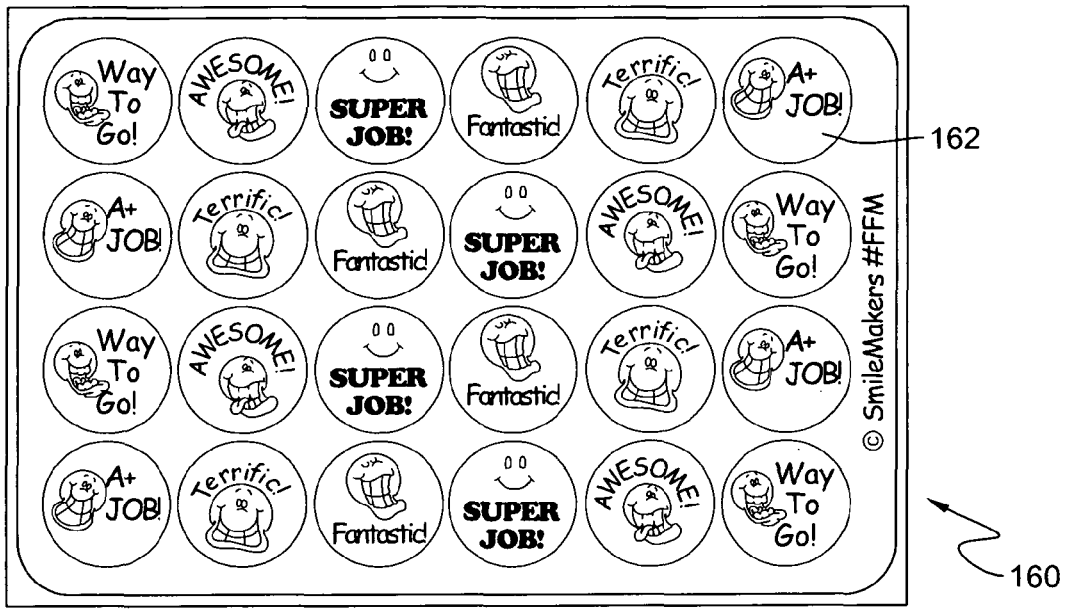
FIG. 6 is one embodiment of a set of stickers for use with the invention.

FIG. 5 depicts an information-containing scorecard (150) that is managed by the student. Preferably, the student management of the scorecard is overseen and approved by the parent and carried by the student between home and school. The scorecard (150) indicates the student's goal achievement progress at home or school, and facilitates engaging the student's attention as often as possible throughout each day of actively participating in the game. The scorecard (150) includes scorecard positions such as name (152), times (154), and initials (156) that facilitate communication by the school teacher to the home teacher. The scorecard may include a "star" (158) position whereby the school teach or behaviorist sticks, or allows the student him/herself to stick a sticker (162; FIG. 6) from a sticker packet (160; FIG. 6) to acknowledge an achievement or accolade. Once the student provides the scorecard with the sticker (160) to the home teacher, the home teacher might provide a star of some other indicia of achievement to a corresponding gameboard position or section, as a form of further positive feedback.

In an embodiment, the gameboard goes home with student and is hung by the home teacher on a refrigerator, or other place in the home that the student most frequents. Every time the student executes a task associated with a theme being conveyed, the student's position on the theme-based gameboard is progressed. The student actually carries out the move/change of gameboard position by marking or moving a piece. When the students get to a star space, the parent or home teacher initials the scorecard. The student carries the scorecard to school, knowing it shows the parent's initials, and conveys it to the school teacher. The scorecard thereby confirms to the teacher that the student really did complete the task. The school teacher then gives the student a sticker for placement on the card, preferably by the students themselves to further reinforce the achievement.

When the scorecard is completely filled with stickers, the student receives a certificate of achievement. For that matter, the completion may also precipitate a class party or some other special event (coordinating with a local business to allow the student to receive discounted or free items that promote self-care and wellness. An example of this might be a discount on a bicycle or a free fruit smoothie, etc. This is all part of a concept that might be called "Community Wellness Cooperative Program," and it might further include that the local business participants pay an annual fee to be members in order to receive the patronage from the school/students. Such fees might be used to fund PTA organizations, etc. Moreover, involving parents, teachers and business in communities puts everyone "on the same page" so to speak in an effort to modify the student behaviours, for example, to promote health and well being and tying it in to the education process.

Figure 7:
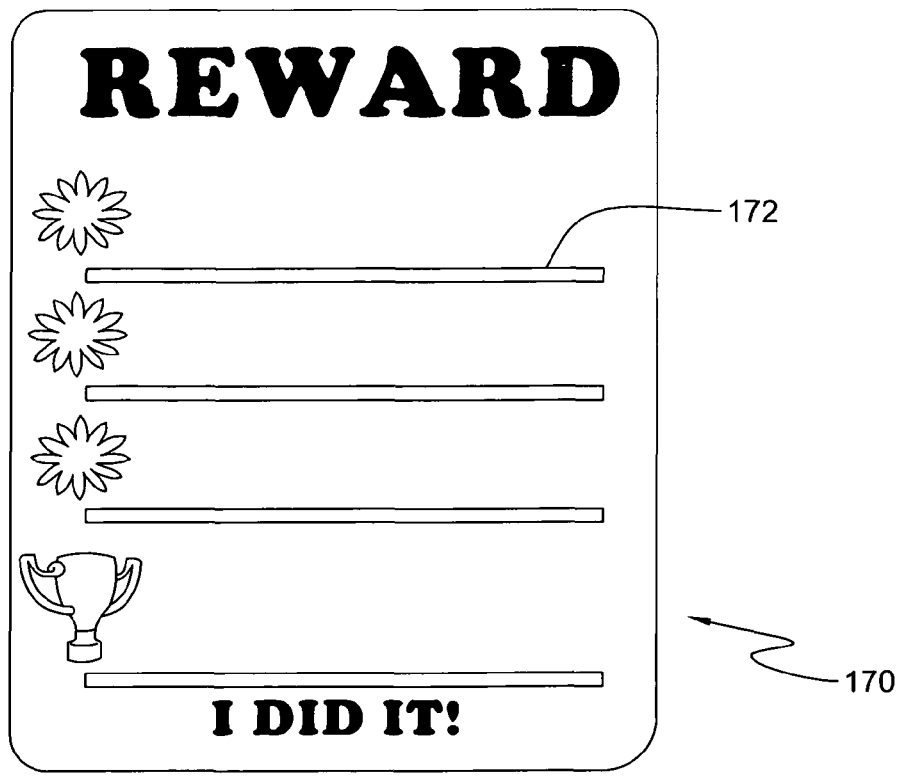
FIG. 7 is one embodiment of a rewards card for use with the invention.

The theme-based goal achievement game preferably includes a reward card (170), as shown in FIG. 7, which is managed by one of the home teacher, the school teacher or behaviorist and both. The reward card (170) is carried by the student. The reward card reflects and communicates the behavior modification progress to the student by different positions (172). The reward card facilitates engaging the student's attention as often as possible throughout each day of actively participating in the game. Various prizes and toys, books, games, CDs, passes, etc. are intended to be used as interim and final achievement awards.

Alternatively, there may be gameboard embodiment that includes a "giving bridge." The giving bridge gameboard has no backside. The giving bridge gameboard is used in a method by which the home and school teacher together impart a character education, or modify the student's character. The character education method is effective because the teacher uses the giving bridge gameboard to work on certain goals with student in the classroom such as being respectful, kind, giving, etc. The students are encouraged to give to others when they get to the giving bridge. The method includes that they get to skip two spaces on the gameboard and go directly home. When the student (or student) gets to the giving bridge they still have to do the original tasks that they have been doing all along while playing the game, i.e., whatever theme they may be doing at the time. The giving bridge activity (giving to others) is done in conjunction with original game task, as described in detail.

The invention also includes a method of teaching to modify a student's behavior in cooperation with a goal achievement game. The game comprises a theme-based gameboard with a theme-based path comprising a plurality of positions representative of completion of theme-defined tasks (FIGS. 1, 3), a place marker for marking the student's instant position on the theme-based gameboard, thereby tracking the student's instant and cumulative progress in traversing the path through a theme-based plan and a set of instructions for educating at least one of a home teacher and a school teacher or behaviorist on the theme-based behavior to be modified and on how to support the student to modify said theme-based behavior in cooperation with the theme-based gameboard (FIGS. 2, 4).

The home teacher and the school teacher or behaviorist first read and understand the instructions to determine their role in supporting the student's effort to modify his/her behavior while participating in the game in cooperation with the theme-based gameboard. The method then includes that at least one of the home and school teacher or behaviourist determine specific interim and final achievement tasks for the student and marking the theme-based gameboard to reflect the specific task positions.

Thereafter, the method includes providing the student with a score card and a marker to mark the student's path position as the student completes each task and displaying the theme-based gameboard in a place in the student's home or classroom that is frequented by the student in order to engage the student's attention as often as possible throughout each day of actively participating in the game. The student marks the theme-based gameboard to reflect the student's achievement including that achievement indicia marked on the scorecard by the home teacher and that achievement indicia identified by the school teacher or behaviourist.

The method includes that once per school day, once per week or even once per "completion of task, the home teacher receiving the scorecard (150) from the student to confirm that the student has completed a particular day's scheduled task(s), and initialling same (156). The student presenting the scorecard (150) to the school teacher or behaviorist who then, based on the student's home task completion or achievement, awards the student by placing a sticker (162) on the scorecard or some comment for communication to the home teacher. Positions (112) on the theme-based gameboard (100) reflect the student's action to action progress in achieving the behavior modification goal, by completion of each assigned task, including a start position (112S), a finish position (112F) and interim reward positions (112R).

The method includes stamping on a gameboard position to reflect the user's progress, or otherwise marking. The student manages a reward card (172), which management is overseen by one of the home teacher, the school teacher or behaviorist and both. The student carries the reward card, which reflect and communicates the behaviour modification progress to the student thereby engaging the student's attention as often as possible throughout each day of actively participating in the game.

Figure 10:
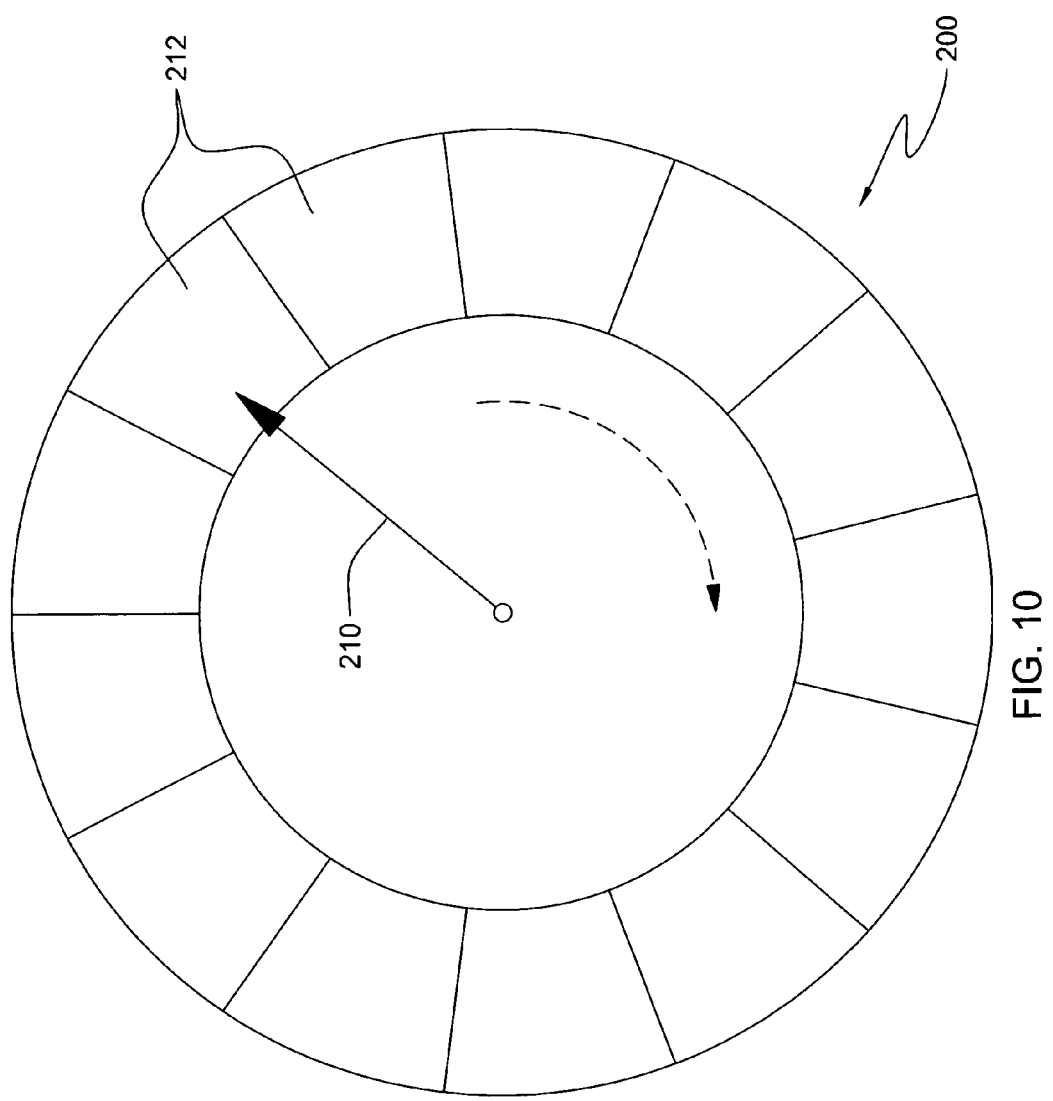
FIG. 10 depicts a spinner that is used by the student to actively participate in choosing a task or reward.
Figure 11:
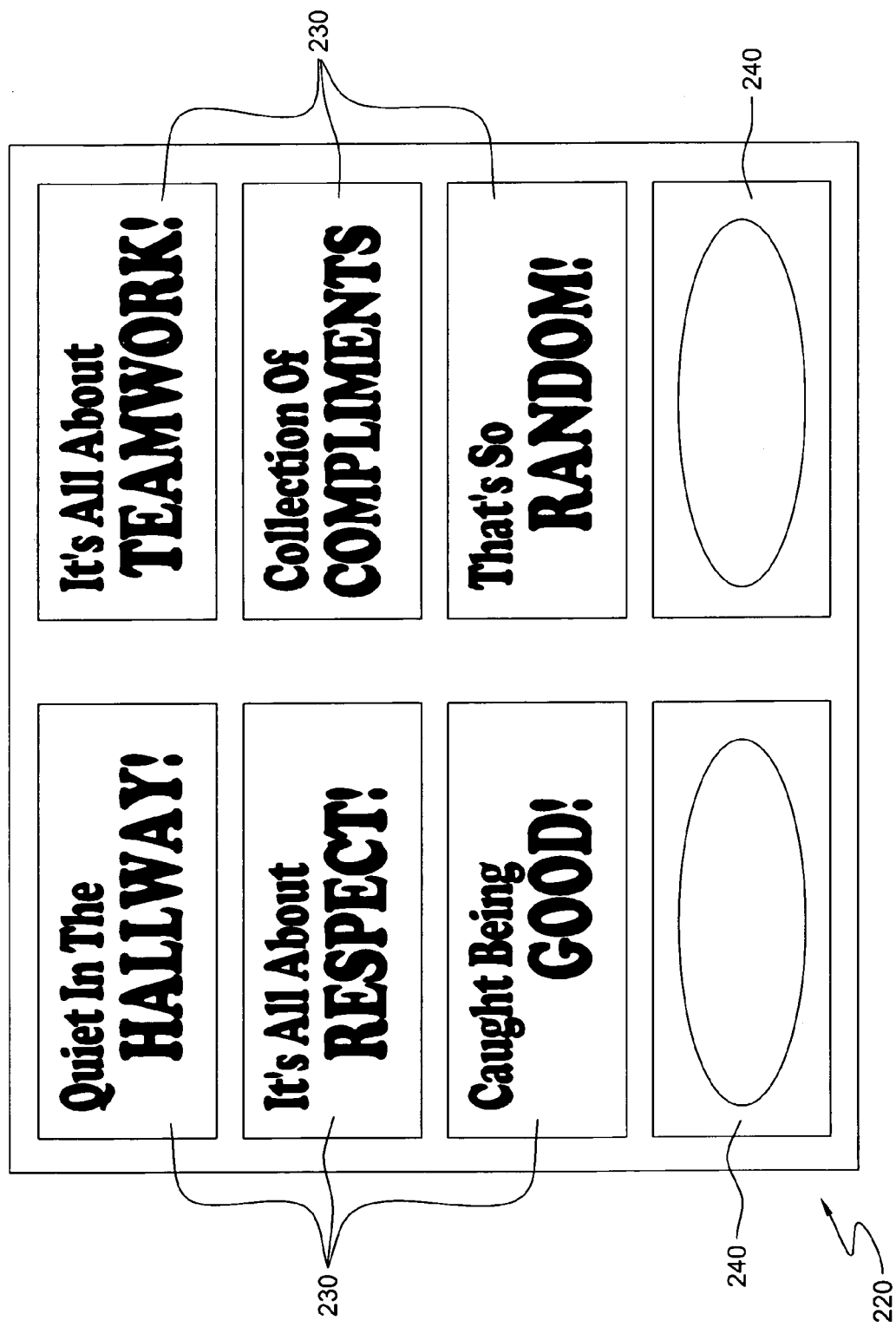
FIG. 11 depicts several cards to be used as a set of cards by a school teacher in association with the large sized game board and method of instruction based on use therewith.

The step of reading and understanding of a particular theme and its instructions includes the use of theme-based overlays, which are placed upon and overlay the gameboard (100, 120). The step of determining preferably includes allowing the student to pick one of a particular card from a deck of theme-based cards to define an award, or allowing the student to spin a dial (210) of a spinner (200), as shown in FIG. 10 to include any number of spots that are representative of an award (or a task, as the case may be). That is, the student spins the dial (210). The dial stops at a box (212). Each box is associated with a reward. The rewards may be fixed, or may be chosen and written in by the teacher.

Figure 8:
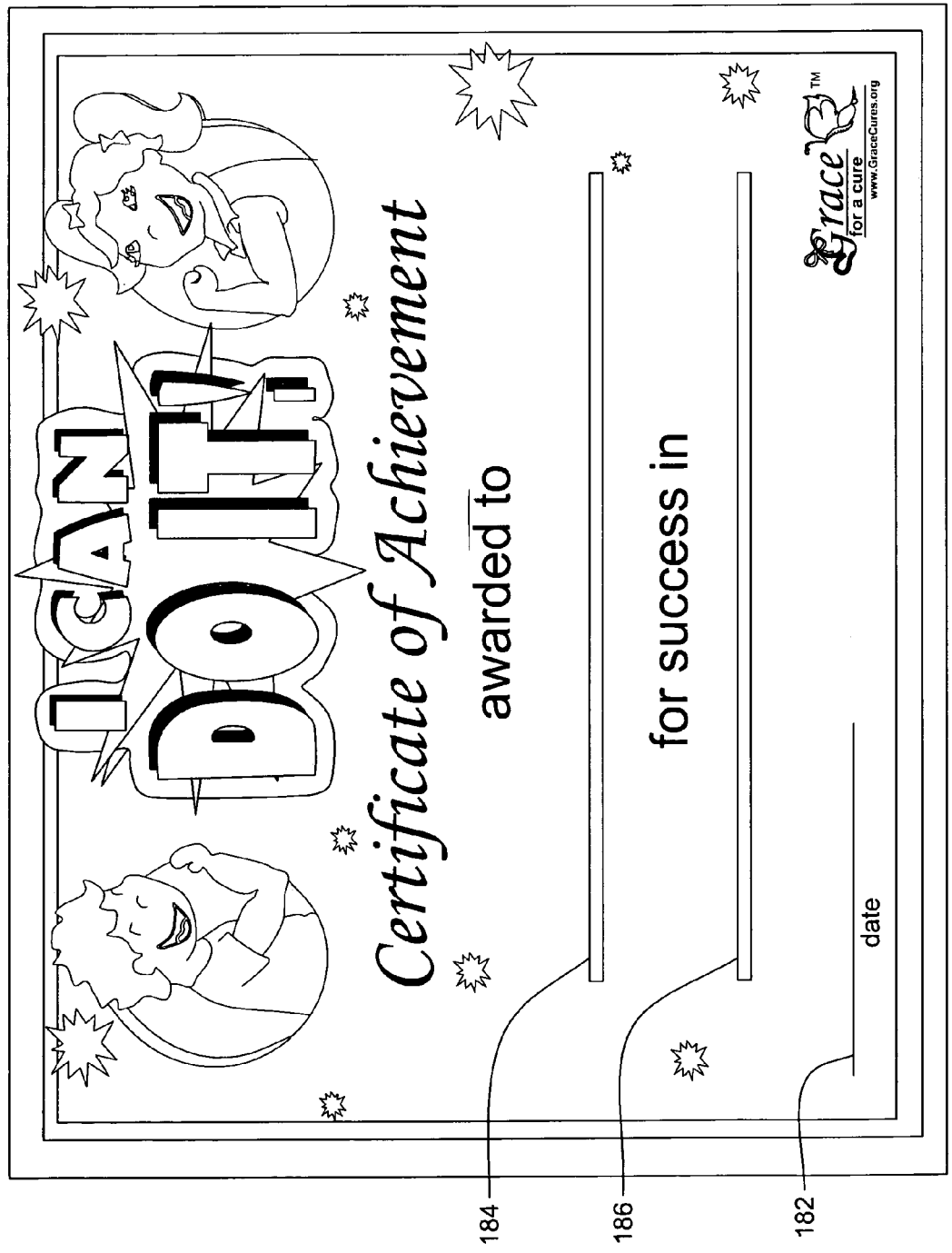
FIG. 8 is one embodiment of a Certificate of Achievement for use with the invention.

A final step of awarding the student for achieving some type of behaviour modification also is included. The step includes the use of a reward in a form of an achievement certificate (180) as shown in FIG. 8. Achievement certificate (180) includes positions for the date (182), the student's name (184) and theme identification (186). The reader should note that the ultimate achievement award is preferable awarded concomitantly with a presentation to the achieving student with another reward, to reinforce the achievement in the student's mind. Other rewards can include any small gift, class party or game, "free homework pass," raffle ticket, toy, redeemable coupon, fruit snack or other healthy food treat, etc., without limitation.

Alternatively a step of using cards is carried out, wherein the cards convey the subject of the game and/or other student information. For example, a card might be used to convey information about a disease and how a student/parent might help the student, or other students who might suffer from a disease or about what people can do to help to cure a disease and/or to educate on a specific disease or condition that effects student (as a form of empathy and character "education"). Additionally, each card can have an activity printed thereon, so that during the game as the student progresses in position along the gameboard path and attain a certain space/position (the heart, for instance) they can pick a card and perform the activity.

The cards may also include a task that keeps them focused during the day, for example, as part of a kids/student "to do list." The card and to do list is incorporated in the teaching technique or method. The school teacher gives each student participating one card, or allows them to pick one card in the "to do list" game, which will help them keep focused on their task and the overall goal of their behavior modification theme, all day. Or to-do list items can be placed in a very visual manner on the board and as student complete them during the day they get closer to achieving some kind of reinforcing reward.

In one example, the task might include: START: MON-FRI (9 OR 10 SQUARES PER DAY WITH STRETCH TIME/MEDITATION/FOCUSING BREAKS PLACED THROUGHOUT to stay aware of inner feelings throughout day. This would keep the student calm and relaxed (say affirmation, breathing exercise, yoga stretches, progressive relaxation).

In addition, the student can fill in squares, or write in what they need to do each day and stamp each task as it is completed. The student is given a reward by the school teacher, the home teacher or both when all tasks are completed. The reward can be something special to do alone, or with friends, etc. If you are going to be successful in any venture whatsoever it is about making a plan, keeping it at the forefront of your brain, and sticking it out until completion.

An alternative embodiment of both the game and the method of teaching include a tree game, or healthy "me" tree theme. The tree game comes with a theme-based gameboard where, and as distinguished from a path, board spaces are actually tree branches. That is, the positions branches and sub-branches represent achievement by the student. That is, the spaces or positions on the tree represent items that need to be eaten each day by the student to modify their eating behavior. The game includes separate little laminated/Velcro pieces that are placed on the tree as each food is eaten throughout the day.

An alternative is a theme-based gameboard that has all of the data/info for learning in the center of the board with the path going around the board in a square (around the edges). The student moves one space each time he learns a specific concept, in cooperation with the school teacher, the home teacher or both. For that matter, the gameboard may be generic (not a particular theme), with the path going around the edges and wherein an overlay is placed in the center to define its theme. The game and gameboard might be sold with multiple overlays, for example, three themes, i.e., one for wellness, one for academics, one for character building. So they buy the one game and it has three amazing benefits for student.

As such, the game and gameboard could be used on a SMART BOARD at school, where the school teacher presents and attaches it to a smart board and revisits it throughout the day to play the game and keep the class focused on the tasks at hand. It is the repetitiveness that drives home the actual behavior modification.

Finally, an alternative embodiment includes a version for behavior management. Many student/students at school have what is called a behavior plan. The behavior management game would be smaller than the 11"×17" version, for example 5.5"×8.5". The game board or sheet would sit on the student's desk. The school teacher would aid or engage the student to "play" the game with them to minimize their negative behavior. Such a gameboard and technique could be used to modify the behavior of student with autism or PDD (spectrum of autism pervasive development disorder). This also can be used for a student with attention deficit disorder (ADD) or with any other kind of behaviours that need to be minimized/modified, or just students that require that "extra push" to pay attention consistently.

The gameboard could have four or five extra spaces on the bottom right that are the same as the stars (reward areas), making it more clear to a student playing the game to mark the spots as he (or she) attains the goals, which is terrific for special needs student.

For that matter, there could also be a spinning wheel on the game board. When the student reaches the star area they can spin the wheel or dial of the spinner (see FIG. 10) to do one of four things (move forward 1, 2, 3, or 4 spaces.). In addition, the game could include that a student does not necessarily receive a reward every time they get to a star, that is, rewards can be made random. One way of doing this would be to have the student roll a dice or spin a wheel, and only if successful would they win a prize. This teaches them that there is an element of chance in life.

Figure 9:
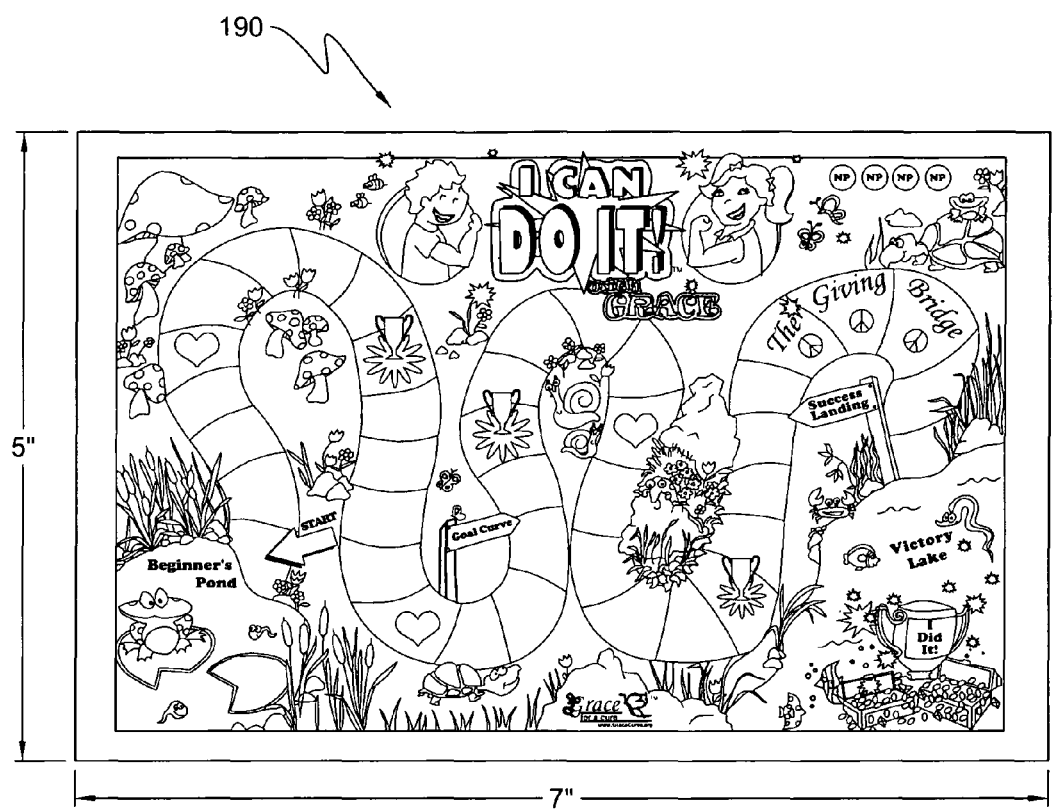
FIG. 9 is a depiction of a reduce version gameboard intended to be fixed to a student's desk to support any lesson imparted by the teaching method by its proximity.

An alternative embodiment includes a reduced size gameboard (190), as shown in FIG. 9 herein. As should be clear form FIG. 9, no instructions or other distractions are included. The reduced size gameboard (190) can be affixed to a student's desk at home or in school, so may be used frequently throughout the day (particularly as affixed to a school desk) to either promote a good behavior or to reduce the occurrences of a particular "undesirable" behavior. The method of teaching uses the additional reinforcement either in lieu of or in cooperation with the full gameboard in the student's home, as already described above.

The reduced size gameboard makes teacher efforts to modify and to reduce a negative behaviour and/or to reinforce good behaviour much more effective. As affixed to the student's desk in the classroom, when he/she completes certain tasks throughout the day, the student moves along the pathway on the gameboard to earn rewards accordingly. This use of short term goals over a day shows prodigious results, particularly when used for several days in a row. The method effectively stops a negative behaviour—every time the student refrains from doing the negative behaviour . . . they move up a space (such as making noise, sucking thumb or other inappropriate behaviours). The method and reduced size gameboard is particularly useful for use with special needs students because it adds incentive for them to focus by the repetitive short-term rewarding.

An enlarged gameboard (e. g., 11×17; 17×34; 22×36; 34×64, without limitation) is quite similar to the home or desk (reduced-size) gameboards or game-sheets (FIGS. 1-4; 9). It is just printed to be larger, e.g., like a poster that hangs on a wall in a classroom. The gameboard for the group-based game and teaching method that includes the use of same, whether separately, or in addition to the school/home gameboard and accompanying elements, is different in that it is used by the teacher in the classroom only, and not used at home. The teacher uses the enlarged gameboard or sheet to modify the behaviour of the group of students under instruction, or playing the game, to take note of observed behaviours, for example, where one of the student participants is "caught being good."

This enlarged gameboard is sold in a kit commercially with a set of cards (220). The cards (230) in the set of cards (220) can be interchanged so that the school teacher can work on any particular behaviour using one of the techniques, for example, "caught being good" as mentioned above or "collection of compliments," by which the student moves forward a space on the gameboard any time they receive a compliment. Preferably, several of the cards are blank (240) so they may be personalized by the school teacher in order to define any goal for a student or class of students that the school teacher understands to be important, especially for the school teacher's particular classroom setting.

The gameboards and associated elements, including instructions, are intended to be sold in kits and used for teaching behavior modification practices to typical student as well as those in special education.

In one embodiment, a set of instructions might include a heading: Teacher Instructions for the "I Can Do It! with Grace™" Five Each Day© School/Home Program The Five Each Day© Program was designed with your students, their parents, and YOU in mind! We want you to have an easier time teaching your student and this game will help. Studies show those students who get proper nutrition are much better learners. When they are eating five fruits and vegetables each day their minds and bodies are functioning at a greater capacity, thus maximizing their ability to pay attention and to feel good all day long. This program motivates students to take ownership of their nutritional intake, making things easier for caretakers and for you as teachers.

Please distribute the packages to the student. Student packages contain a one board game, one score card and a game piece (stamper). Instruct students to write their name on the score card. Keep the stickers and the achievement certificates—you will need them later. Tell student that they are to bring the games home and hang them using tape or "fun tack" in an area where they can easily access them (the refrigerator is an excellent location). Parent instructions are located on the back of the game board.

How does it work? The student hang the board up at home and use the smiley face game piece to move along the path each time they eat five each day. When they reach the heart space they need to do at least 15 minutes of physical activity. When student reaches the reward space (yellow star) on the game board they bring their score card into school and receive a sticker from you. Their score card is initialled by their parent or caretaker each week.

The game is designed for weekday use only, but student should be encouraged to eat five each day on the weekends as well. At the program's completion (at the end of the six weeks) give them their Certificate of Achievement.

It is recommended that you have a special class party or some other kind of celebration when the program is complete. The more excitement around the game, the better! Here are some ideas to help you to recognize your student's great accomplishments . . .

•Class plays a fun game • Free recess (indoor/out) • Free computer lab time • Classroom prize box SPECIAL NEEDS AWARENESS: "I Can Do It! With Grace" School/Home Programs help student become more aware of (and sensitive to) special needs student. Please encourage them to go to our website to play an educational game and to receive special messages from Grace—a very cool special needs student who inspired this program Instructions for poster (large gameboard) gameboard:

The teacher "positive behavior inspiration" gameboard is an 18"×24" poster that is displayed in the classroom where it can be seen by students and utilized by the teacher to reinforce good behavior collectively as a team activity. The game includes not only the poster or large-size gameboard, but also with 8 cards that can be used interchangeably and affixed to the game board. Two of the cards are blank so the teacher can create their own "game" based on what they want to work on with their class.

The game may be played as part of a character education curriculum, teaching students how to handle themselves and to behave in a social setting. This can be used with typical or special needs student. Elements of character education are things like etiquette, manners, respect for self and others, kindness, compassion and teamwork. The idea is to get student to appreciate each other and to be reinforced and rewarded for behavior that fosters care and kindness, dignity and respect to others. This game puts these concepts into action—moving student along the gameboard each time they demonstrate these positive, necessary behaviors.

When a student accomplishes a pre-determined task (such as performing a random act of kindness towards another student for example) he is moved a place on the classroom game-board (an erasable stamper is used for this) and his initials are placed next to the stamped area. He also marks a score card that is kept in his desk (under the teacher or behaviorist's supervision). The first student to finish their score card in the classroom receives an achievement certificate and special recognition of some sort by the teacher (maybe he or she gets a "get out of homework free" pass or becomes the class leader for the day, etc.)

Collectively, as a group when the class arrives at the star area they are reinforced as a whole—they may, perhaps be able to get out of their seats and do a fun yoga pose or some other kind of positive action that they would enjoy. This game also includes a special "giving bridge"—this is explained in an earlier section of this application. When the class finishes the whole game the student that participated receive special recognition and some kind of reward. The game further incorporates the use of yoga poses that coincide with whatever lesson is trying to be taught regarding character development or some other type of more curriculum based subject. Game comes with poster, interchangeable cards, and score cards for student, stickers and achievement certificates for teacher as well as directions for the teacher explaining how to "play" the game.

Directions for the "Positive Behavior Inspiration desktop game" Student receive an individual game that is placed on their desk—the size is 5'×7" or similar. The game is affixed to the student's desk by using a piece of "fun tack" or sticky double sided tape. The student used a stamper to move themselves along the board when they complete whatever task they are working on (for example—they may play a game for reducing some type of negative behavior such as calling out in class). So every time 10 minutes goes by (let's say) and they do not call out—they move up a space on the board with their stamper. They have a score card that is kept in their desk and when they get to the star area on their game they may check off their card—when they complete the card they receive a sticker and then some other kind of reinforcing reward for their efforts (something small but motivational) The game can be used over and over to teach student important lessons about self-control, etc. As the student masters one behavior . . . he or she is given a new one.

Retail game directions are on BACK of game that had the giving bridge—you already have them printed and labeled as one of the drawings—they say "your families well being brought to you by "I can do it with Grace".

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended claims.

What is claimed is:

1. A method of teaching to modify a student's behavior in cooperation with a goal achievement game comprising a theme-based gameboard with a theme-based path comprising a plurality of positions representative of completion of theme-defined tasks, a place marker for marking the student's instant position on the theme-based gameboard, thereby tracking the student's instant and cumulative progress in traversing the path through a theme-based plan, a set of instructions for educating a home teacher and a teacher or behaviorist at school on the theme-based behavior to be modified and on how to support the student to modify said theme-based behavior in cooperation with the theme-based gameboard and a coupon or certificate of achievement utilized as a reward, the method comprising steps of:

the home teacher and, the teacher or behaviorist at school, reading and understanding the instructions to determine their respective role in supporting the student's effort to modify his/her behavior while participating in the game in cooperation with the theme-based gameboard and determining specific interim and final achievement tasks for the student and marking the theme-based gameboard to reflect the specific task positions;

providing the student with a score card and a marker to mark the student's path position as the student completes each theme-based task;

displaying the theme-based gameboard in a place in the student's home or in a classroom at school that is frequented by the student in order to engage the student's attention as often as possible throughout each day of actively participating in the game;

the student marking the theme-based gameboard to reflect the student's achievement including that achievement indicia marked on the scorecard by the home teacher and that achievement indicia identified by the school teacher or behaviorist;

once per school day or once per week, the home teacher receiving the scorecard from the student to confirm that the student has completed a particular day's scheduled task(s), and initialing the scorecard and the student presenting the scorecard to the teacher or behaviorist at school who then, based on the student's home task completion or achievement, as confirmed by the home teacher, awards the student by placing a sticker on the scorecard or some comment for communication to the home teacher;

presenting the coupon or the certificate of achievement to the student when the scorecard is filled with stickers; and redeeming the coupon or the certificate of achievement with at least one local business to receive discounted or free items that promote self-care and wellness as a reward.

2. The method of teaching as set forth in claim 1, wherein the positions on the theme-based gameboard reflect the student's action to action progress in achieving the behavior modification goal, by completion of each assigned task, including a start position, a finish position and interim reward positions therebetween.

3. The method of teaching as set forth in claim 1, wherein the step of the student marking includes stamping on a gameboard position to reflect the user's progress.

4. The method of teaching as set forth in claim 1, further comprising managing a reward card by one of the home teacher, the teacher or behaviorist at school and both, and carrying the reward card by the student to reflect and communicate the behavior modification progress to the student and to facilitate engaging the student's attention as often as possible throughout each day of actively participating in the game.

5. The method as set forth in claim 1, wherein the step of reading and understanding of a particular theme and its instructions includes the use of theme-based overlays, which are placed upon and overlay the gameboard.

6. The method as set forth in claim 1, wherein the step of determining includes allowing the student to pick one of a particular card from a deck of them-based cards to define an award.

7. The method as set forth in claim 1, wherein the step of determining includes allowing the student to spin a spinner that falls on a prize or award by chance.

8. The method as set forth in claim 1, further including a larger-sized gameboard that is provided in a central location within the classroom, and wherein the school teacher utilizes the larger-sized gameboard to engage every student in the class to support the home teacher effort in cooperation with the gameboard.

\* \* \* \* \*